United States Patent [19]
Yokota

[11] Patent Number: 5,187,848
[45] Date of Patent: Feb. 23, 1993

[54] METHOD OF ASSEMBLING A SEAT BACK

[75] Inventor: Masaaki Yokota, Akishima, Japan

[73] Assignee: Tachi-S Co. Ltd., Tokyo, Japan

[21] Appl. No.: 780,367

[22] Filed: Oct. 22, 1991

[51] Int. Cl.⁵ .................................................. B68G 7/00
[52] U.S. Cl. .......................................... 29/91.1; 29/469
[58] Field of Search ..................... 29/91.1, 91.5, 897.2,
29/448, 449, 469; 297/284 R, 353, 284 A-284 E

[56] References Cited
U.S. PATENT DOCUMENTS

| 4,732,097 | 3/1988 | Guilhem | 29/91.5 X |
| 5,058,953 | 10/1991 | Takagi et al. | 297/284 R |

FOREIGN PATENT DOCUMENTS

| 61-111399 | 7/1986 | Japan. |
| 61-118500 | 7/1986 | Japan. |
| 2-5989 | 1/1990 | Japan ......................... 29/91.5 |
| 2-130300 | 10/1990 | Japan. |

Primary Examiner—Mark Rosenbaum
Assistant Examiner—S. Thomas Hughes
Attorney, Agent, or Firm—Oldham, Oldham & Wilson Co.

[57] ABSTRACT

A method of assembling a seat back of split type, which involves preparing a lower seat-back frame having a pre-formed upper seat-back section, then forming a lower seat-back upholstery unit having an upper opening therein, and producing the seat back by inserting the upper seat-back section though the opening of lower seat-back upholstery unit.

3 Claims, 3 Drawing Sheets

METHOD OF ASSEMBLING A SEAT BACK

BACKGROUND OF THE INVENTION

1. Field of the Invention

The present invention relates to a method of assembling a split-type seat back of an automotive seat which comprises an upper seat-back section and a lower seat-back section, each of which is formed independently, with the upper seat-back section being rotatable fowardly and backwardly relative to said lower seat-back section.

2. Description of Prior Art

Reference is made to FIGS. 1(A) and 1(B), which show a typical bendable split seat back (SB') comprising a lower seat-back section (LB) and an upper seat-back section (UB), independently of each other, wherein the latter section (UB) is bendable or rotatable forwardly and backwardly relative to the former section (LB). The lower seat-back section (LB) incorporates therein a lower seat back frame (1'), and the upper seat-back section (UB) incorporates therein an upper seat back frame (43'). Upon the upper seat-back section (UB), there may be mounted a headrest (HR) as indicated by the phantom line.

As can be seen, the upper seat-back section (UB) is movably supported by an upper frame (43') which is rotatably connected to the lower one (1'). This is also framework of the split seat back of this kind and although not shown clearly, the lower frame (1') is covered with a suitable padding and top cover member to represent the shown appearance of lower seat back body (LB), while as illustrated clearly in FIG. 1(B), to the upper frame (43'), a unit of upholstery (i.e. (UB)) comprising a padding (42') and top cover member (41') affixed thereover is attached so as to establish the upper seat-back section (UB).

In a practical assemblage, as shown in FIG. 1(B), at the bottom side of this upholstery unit, both terminal ends of top cover member (41') are not connected together to make open such bottom side in which a securing slit (42'a) formed in the padding (42') is exposed, and then, the steps in this respect consists in mounting the upholstery unit to the upper frame (43') by way of causing the frame (43') to be inserted into the slit (42'a) and connecting together the terminal ends of top cover member (41'). However, according to this conventional method, there is a troublesome need on the manufacturers' part to orient the upper frame (43') towards the slit (42'a) of the upper seat-back upholstery unit, and further, to insert their hands into the juncture between the upper and lower seat-back sections (UB)(LB) in order to fix or connect together the terminal ends of top cover member of upper seat-back section (UB).

SUMMARY OF THE INVENTION

It is a purpose of the present invention to provide a method of assembling a seat back of a split type, which is improved in assembling together seat back constituent elements easily and effectively.

In order to achieve such purpose, according to the present invention, there is provided the steps of forming a framework of upper seat-back frame and lower seat back frame, in which the former is movably connected with the latter, wherein the upper seat-back frame being provided with an upholstery to create an upper seat-back section, then forming a lower seat-back upholstery unit having an upper recessed area in which an opening is perforated, then attaching such upholster unit over the lower seat-back frame by way of bringing the lower seat-back frame towards a rear side of the upholstery unit and inserting the upper seat-back section through the opening onto the recessed area of same upholstery unit, and thereafter, securing the upholstery unit to the lower seat-back frame to thereby define a lower seat-back section.

Accordingly, by simply inserting the the preformed upper seat-back section through the opening of lower seat-back section upholstery unit, it is easy to assemble the spilt-type seat back without orienting the upper seat-back frame and further without any need on the worker's part to insert his or her hands into between the upper and lower seat-back sections for pulling out their repsective terminal ends.

DETAILED DESCRIPTION OF PREFERRED EMBODIMENT OF THE INVENTION

Referring to FIGS. 2 through 5, there is illustrated a method of assembling a split-type or bendable seat back in accordance with the present invention.

Figure 1A:
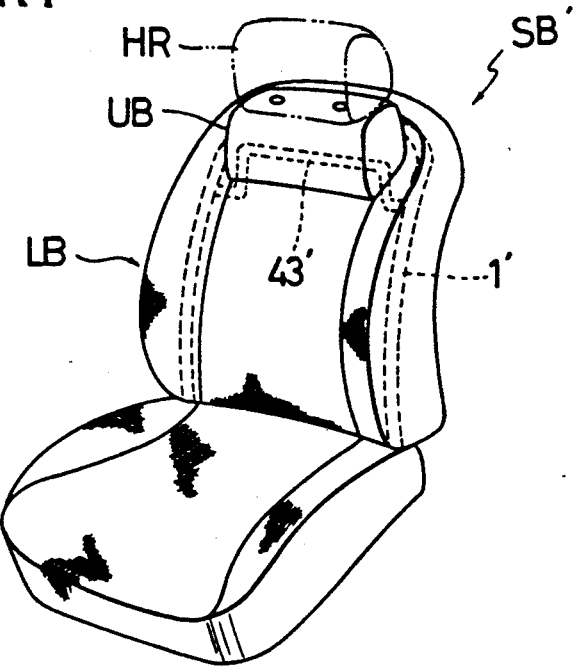
FIGS. 1(A) and 1(B) are a schematic perspective view of a conventional seat having split-type seat back.
Figure 1B:
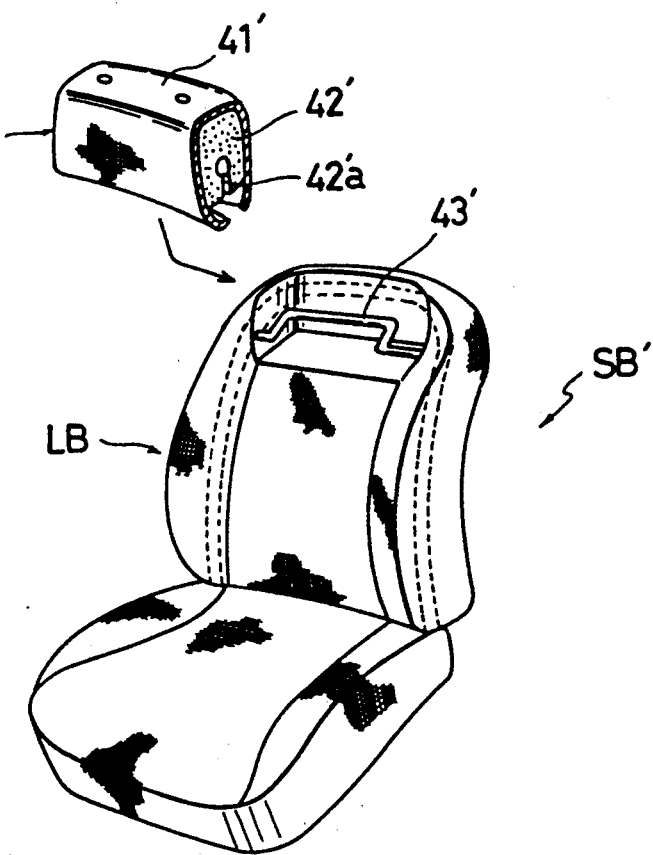
Figure 2:
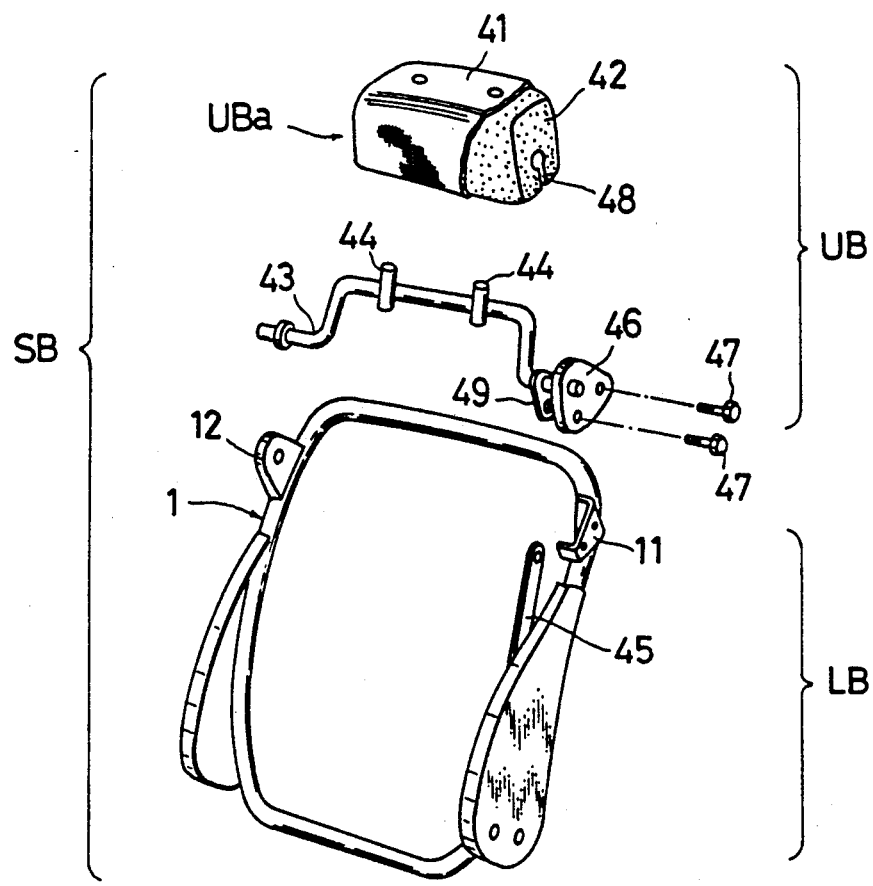
FIG. 2 is an exploded perspective view of framework of seat back in accordace with the invention.

With first reference to FIG. 2, an exploded perspective view is given of a bendable split seat back as generally designated by (SB), and also this figure serves to show a first method in accordance with the present invention, wherein an upper seat back section (UB) is to be assembled with a lower seat back-back section (LB). In the embodiment illustrated, the upper seat-back section (UB), similar to that (UB') of the aforementioned prior art, references to an independent upper section of seat back, whereas the lower seat-back section (LB), similar to that (LB'), refers to an independent lower section of seat back, as understandable from FIGS. 3 to 5 in conjunction with the descriptions herereinafter.

Designation (43) stands for a crank-like seat-back fame having a pair of headrest stay holders (44) (44) fixed thereon, which forms a framework for the upper seat-back section (UB), and designation (1) stands for a lower seat-back frame forming a framework of the lower seat-back section (LB).

At first, it should be understood that, in the steps of coupling the upper seat-back frame (43) with lower one (1), as known in the hitherto method, referring to FIG. 2, one end of the upper seat-back frame (43) is secured rotatably to a support member (12) formed on one lateral section of the lower frame (1), then a bearing member (46) is equipped at another end of the upper seat back frame (43) is fixed by bolts (47) to a support bracket (11) at another lateral section of the lower frame (1), and the upper end of a connecting rod (45) is connected to a link member (49), whereby the upper seat-back frame (43) is operatively coupled to the lower seat-back frame (1). The connecting rod (45) is controllable by a suitable control device so as to enable adjustment of its vertical movement for causing corresponding forward and backward rotation of the upper seat-back frame (43) with respect to the lower seat-back frame (1), as with the known state of art.

Now, a description will be made of subsequent steps in detail, which are a principal part of method in accordance with the invention.

As seen from FIG. 2, an upholstery unit for forming the upper seat-back section (UB), as designated, by (UBa), is provided firstly, which comprises a foam padding (42), a slit (48) formed at the bottom threreof, and a covering member (41) affixed over such padding (42). This upholstery unit (UBa) is mounted on the upper seat-back frame (43) by causing that frame (43) to be inserted into the slit (48) of the unit (UBa) and connecting together both terminal ends of the upholstery unit top cover member (41), as can best be seen in FIG. 4 in conjunction with FIGS. 3 and 5. Preferably, a hog ring (H) is used for connecting together such upholstery unit terminal ends, as shown in FIG. 4. In that way, there is obtained a framework having the upper seat-back section (UB), as seen in FIG. 3.

Figure 3:
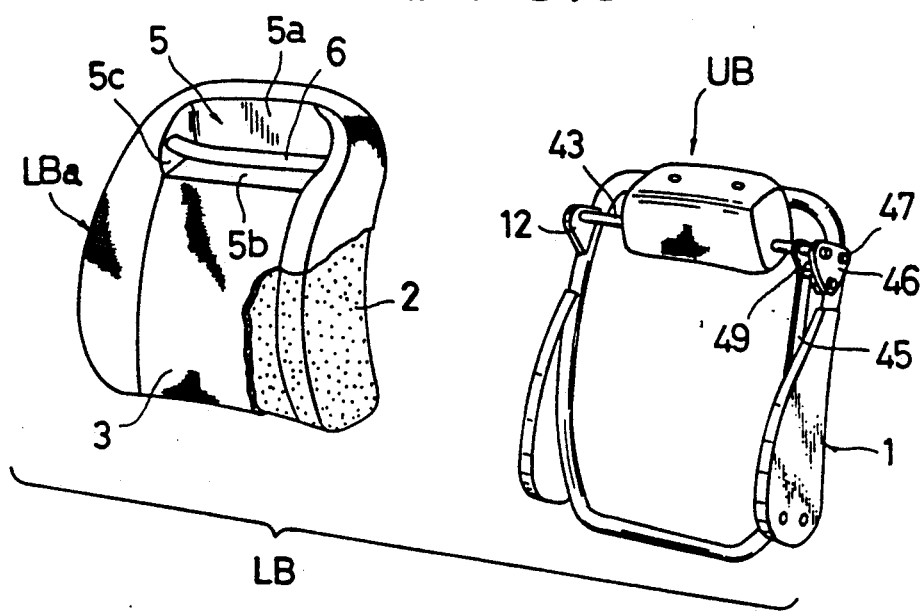
FIG. 3 is a schematic explanatory view showing a state where the seat back is to be formed.
Figure 4:
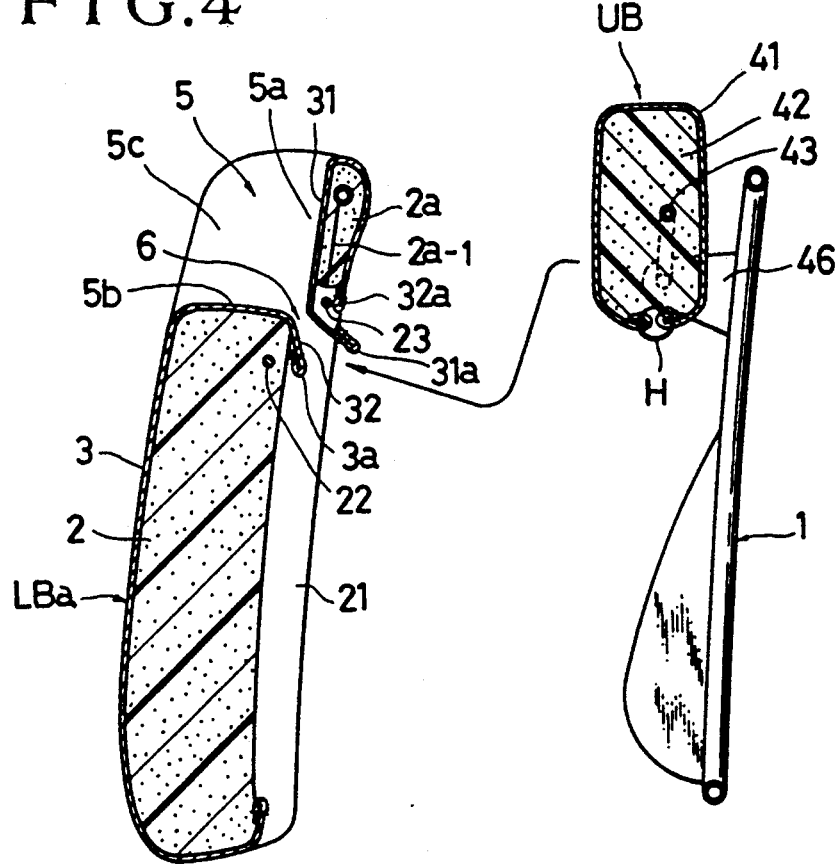
FIG. 4 is a sectional view of the seat back as in FIG. 3.
Figure 5:
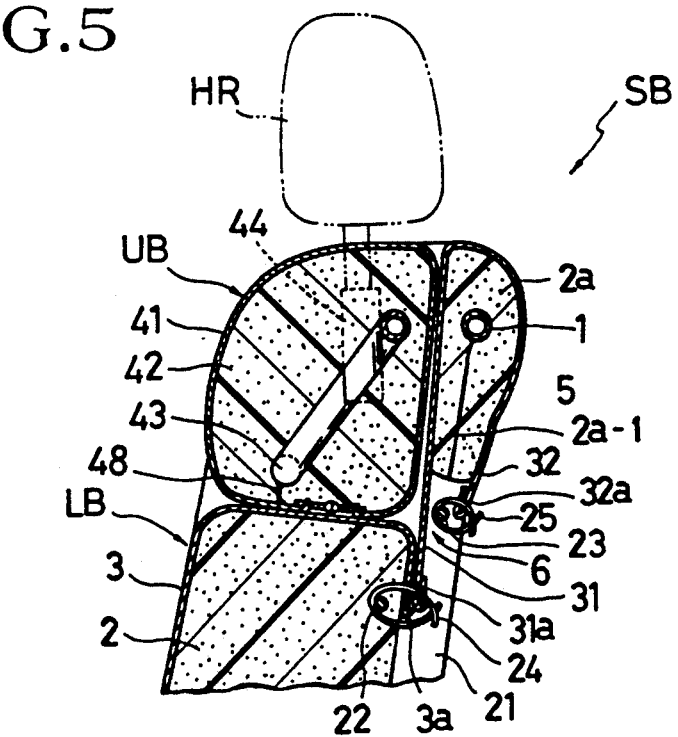
FIG. 5 is a partially enlarged sectional view showing the state where the seat back has been assembled.

Next, referring to FIGS. 3 and 4, there is shown an upholstery unit (LBa) which is to be assembled on the remaining lower seat-back frame (1) so as to obtain a lower seat-back section (LB). The upholstery unit (LBa) comprises a foam padding (2) and a top cover member (3) affixed thereover. More specifically, the upper area of unit (LBa) is formed with a cutaway, recessed section (5) which includes a vertical wall part (5a) defined at a, rear side of unit (LBa) and a horizontal wall part (5b) defined at a frontal side thereof, and an elongated opening (6) formed along the boundary line between those vertical and horizontal wall parts (5a) (5b). As shown, the opening (6) extends its ends over to the respective both lateral vertical wall parts (5c), at a certain angle of inclination relative to the horizontal opening part. The cut-away, recessed section (5) is so dimensioned as to receive the foregoing upper seat-back section (UB) therein. At its area corresponding to the opening (6), the top cover member (3) is cut such that a lower terminal end (3a) is formed, extending behind the padding (2), and an upper terminal end (31a) is formed, which extends downwardly continuously from the vertical wall part (31) down to behind the padding (2), as in FIG. 4. An insert wire (22) is embedded in the padding (2) at the point adjacent to the lower terminal end (31a). The vertical wall part (31) includes a vertical padding portion (2a) integral with the main padding (2), and an insert wire (23) extending below the vertical padding portion (2a). In the vertical padding portion (2a), there is formed a slit (2a-1) opened at its lower end, into which slit the upper frame section of the lower seat-back frame (1) is to be inserted. In the vicinity of the lower end of that vertical padding portion (2a), there are disposed the terminal end (31a) of cover member (3) and another opposite terminal end (32a) of same which covers the rear side of vertical padding portion (2a), but, as can be seen in FIGS. 4 and 5, the lower extension part (31) of cover member (3), with such upper terminal end (31a) extends so long to spread across the opening (6) down to the point near the insert wire (22), and another opposite extension part (32) of cover member (3) with the terminal end (32a) extends short down to the point near the upper insert wire (23).

Referring again to FIGS. 3 and 4, the aboveconstructed constructed lower upholstery unit (LBa) is then assembled upon the lower seat-back frame (1) to which the upper seat-back section (UB) has been attached. At this stage, the first step is to pull the upper and lower terminal ends (31a)(3a) outwardly so as to enlarge the opening (6) as widely as possible. Then, the upper seat-back section (UB) is inserted through thus-enlarged opening (6) to locate in the cut-away, recessed portion (5) and at the same time, the upper frame section of lower seat-back frame (1) is inserted into the slit (2a-1) of vertical wall part (5a). Thus, the frame (1) is placed in position within the rear recessed area (21) of lower upholstery unit (LBa). Thereafter, as shown in FIG. 5, both upper and lower terminal ends (31a) (3a) are anchored by a hog ring (24) which is secured about the lower insert wire (22), and another terminal end (32a) is anchored by another hog ring (25) which is secured about the upper insert wire (23). Here, it is to be seen that the covering member extension (31a) spreads across the opening (6) thereby functioning as wall to prevent the upper seat-back section (UB) against removal from the opening (6).

As a result, the upper and lower seat back sections (UB)(LB) are defined in the seat back (SB) in a mutually independent manner, such that the upper seat-back section (UB) is movable forwardly and backwardly relative to the lower seat-back section (LB).

It is noted that the upper upholstery unit (UBa) is formed by merely stretching the cover member (41) over the outer surface of padding (42), and likewise, the lower upholstery unit (LBa) is formed by merely stretching the cover member (3) over the padding (2). This is preferable because no adhesive agent is needed and the above-described connection of terminal ends (3a, 31a, 32a) can simply be effected by use of hog rings, which is best suited for the present nature of assemblages.

According to the present invention, it is appreciated that the upper seat-back section (UB) was already formed as a unit together with associated frame (43), which is simply inserted through the opening (6) to rest on the cut-away portion (5), thereby allowing the lower upholstery unit (LBa) to be easily assembled upon the associated frame (1), without care being paid, as in the prior art, to orient the upper seat-back frame (43) towards the slit (48) of upper unit (UBa) and without any need to insert hands into between the upper and lower seat-back sections for connecting together the terminal ends. In this respect, accordting to the invention, the terminal ends of cover member are disposed externally so that the manufacturer can readily reach them with his or her hands for assembling the seat back.

What is claimed is:

1. A method of assembling a split-type seat back, in which said seat back includes an upper seat-back section and a lower seat-back section, which are formed independently of each other, said method comprising the steps of:

connecting an upper seat-back frame to a lower seat-back frame in such a manner as to be rotatable forwardly and backwardly relative thereto;

attaching a first padding over said upper seat-back frame;

stretching a first covering member over said first padding, so as to form said upper seat-back section;

providing a second padding for said lower seat-back frame, said second padding having a cut-away, recessed part formed at an upper frontal side of said second padding, with an opening being formed in said cut-away, recessed part;

attaching a second covering member over said second padding, said second covering member being formed with an opening identical to said opening of said second padding, so as to produce an upholstery unit having said recessed part in which an opening is defined by said two openings;

then placing said upholstery unit over said lower seat-back frame by way of bringing said lower seat-back frame towards a rear side of said upholstery unit and inserting said upper seat-back section through said opening onto said cut-away recessed part; and thereafter, securing said upholstery unit to said lower seat-back frame, to thereby define said lower seat-back section, whereby said upper and lower seat-back sections are assembled together to form said seat back.

2. The method as defined in claim 1, wherein a headrest is provided on said upper back-seat section.

3. The method as defined in claim 1, wherein said second covering member associated with said lower seat-back section is formed with upper and lower terminal ends at said opening in said lower seat-back section, said upper and lower terminal ends extending through said opening to project a backside of said lower seat-back section, and further comprising pulling said upper and lower terminal ends to enlarge said opening to allow easy insertion of said upper seat-back section.

* * * * *